(12) United States Patent
Chen

(10) Patent No.: US 10,759,484 B2
(45) Date of Patent: Sep. 1, 2020

(54) HEIGHT ADJUSTMENT ASSEMBLY FOR BICYCLE SADDLE

(71) Applicant: Chao-Hu Chen, Taichung (TW)

(72) Inventor: Chao-Hu Chen, Taichung (TW)

(73) Assignee: KALLOY INDUSTRIAL CO., LTD., Taichung ( * ) Notice: Subject to any disclaimer, the term of this patent is extended or adjusted under 35 U.S.C. 154(b) by 187 days.

(21) Appl. No.: 16/166,168

(22) Filed: Oct. 22, 2018

(65) Prior Publication Data

US 2020/0122798 A1 Apr. 23, 2020

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ............................... B62J 1/08; B62J 2001/085
See application file for complete search history.

(56) References Cited

U.S. PATENT DOCUMENTS

| 4,807,856 A * | 2/1989 | Teckenbrock | B62K 19/36 188/67 |
| 6,802,520 B2 * | 10/2004 | Chen | B62J 1/08 280/226.1 |
| 9,969,448 B1 * | 5/2018 | Chen | B62J 1/10 |
| 10,604,201 B2 * | 3/2020 | Shirai | C22F 1/006 |

* cited by examiner

*Primary Examiner* — Joseph M Rocca
*Assistant Examiner* — Harold Eric Pahlck, III

(57) ABSTRACT

A height adjustment assembly for a bicycle saddle includes an inner tube with a saddle clamp on the top thereof. A retractable device is located in the inner tube and is fixed to the saddle clamp. The inner tube is movably inserted into an outer tube. A control device is located in the outer tube and includes a top part, a block and an operation unit. The top part is fixed to the retractable device and the switch of the retractable device extends through the top part and activates an operation unit received in the block. The operation unit is activated by a cable so as to move the switch of the retractable device to adjust the height of the saddle.

5 Claims, 6 Drawing Sheets

HEIGHT ADJUSTMENT ASSEMBLY FOR BICYCLE SADDLE

BACKGROUND OF THE INVENTION

1. Fields of the Invention

The present invention relates to an adjustment assembly, and more particularly, to a height adjustment assembly for a bicycle saddle, and the adjustment assembly is compact and efficient.

2. Descriptions of Related Art

The conventional height adjustment assembly for a bicycle saddle generally includes multiple parts so that a proper room has to be provided to install the adjustment assembly. However, the outer tube of the conventional adjustment assembly requires inner threads so that the outer tube has to be thick enough to have the inner threads. If the thickness of the outer tube is not thick enough, the outer tube can be easily broken at the portion with the inner threads. Besides, a sufficient room is required to accommodate the multiple parts of the adjustment assembly, this makes the whole seat post be bulky and difficult to be installed to the seat tube of bicycles.

The present invention is intended to provide a height adjustment assembly for a bicycle saddle and eliminates the drawbacks mentioned above.

SUMMARY OF THE INVENTION

The present invention relates to a height adjustment assembly for a bicycle saddle, and comprises an inner tube which has a saddle clamp connected to the top thereof so as to clamp a saddle. A retractable device is located in the inner tube and has a top hole defined in the top end thereof, and a first threaded section formed on a lower end thereof. A bolt extends through the saddle clamp and is threadedly connected to the top hole. The inner tube is movably inserted in an outer tube which has a second threaded section extending from the lower end of the outer tube. A control device is located in the outer tube and includes a top part, a block and an operation unit. The top part has a locking hole and two through holes. The first threaded section of the retractable device is connected to the locking hole to secure the retractable device between the inner tube and the outer tube. The block has a room defined through the center thereof, and the room is located between two threaded holes. Two bolts extend through the two through holes of the top part and are connected to the threaded holes of the block to connect the top part with the block. The operation unit is located in the room. A switch of the retractable device extends through the locking hole and contacts the top of the operation unit. The operation unit is activated by a cable and configured to activate the retractable device to move the inner tube together with the saddle. A sleeve has inner threads defined in the inner periphery thereof so as to be connected to the second threaded section.

Preferably, the operation unit includes an ascending member, a descending member and a gear. The ascending member, the descending member and the gear are located in the room. The ascending member and the descending member each have a horizontal portion and a vertical portion which is connected perpendicular to the horizontal portion. Each of the vertical portions has a toothed portion which is engaged with the gear. The descending member has an anchoring portion which is adapted to be connected with one end of the cable.

Preferably, the inner tube has multiple beads on the outer periphery thereof, and the outer tube has multiple grooves defined in the inner periphery thereof. The beads are respectively movable within the grooves to prevent the inner tube from spinning in the second passage of the outer tube.

Preferably, the block has a radial hole defined radially therethrough. The gear has a central hole. A pin extends through the radial hole and the central hole to position the gear in the room.

Preferably, the retractable device is a hydraulic cylinder or a pneumatic cylinder.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
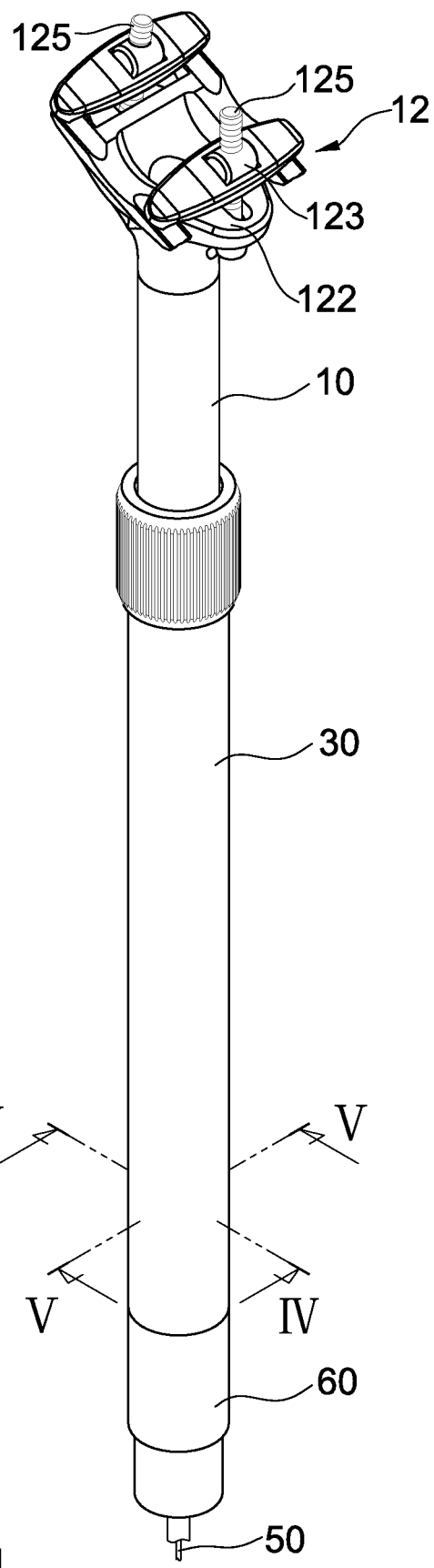
FIG. 1 is a perspective view to show the height adjustment assembly of the present invention.
Figure 2:
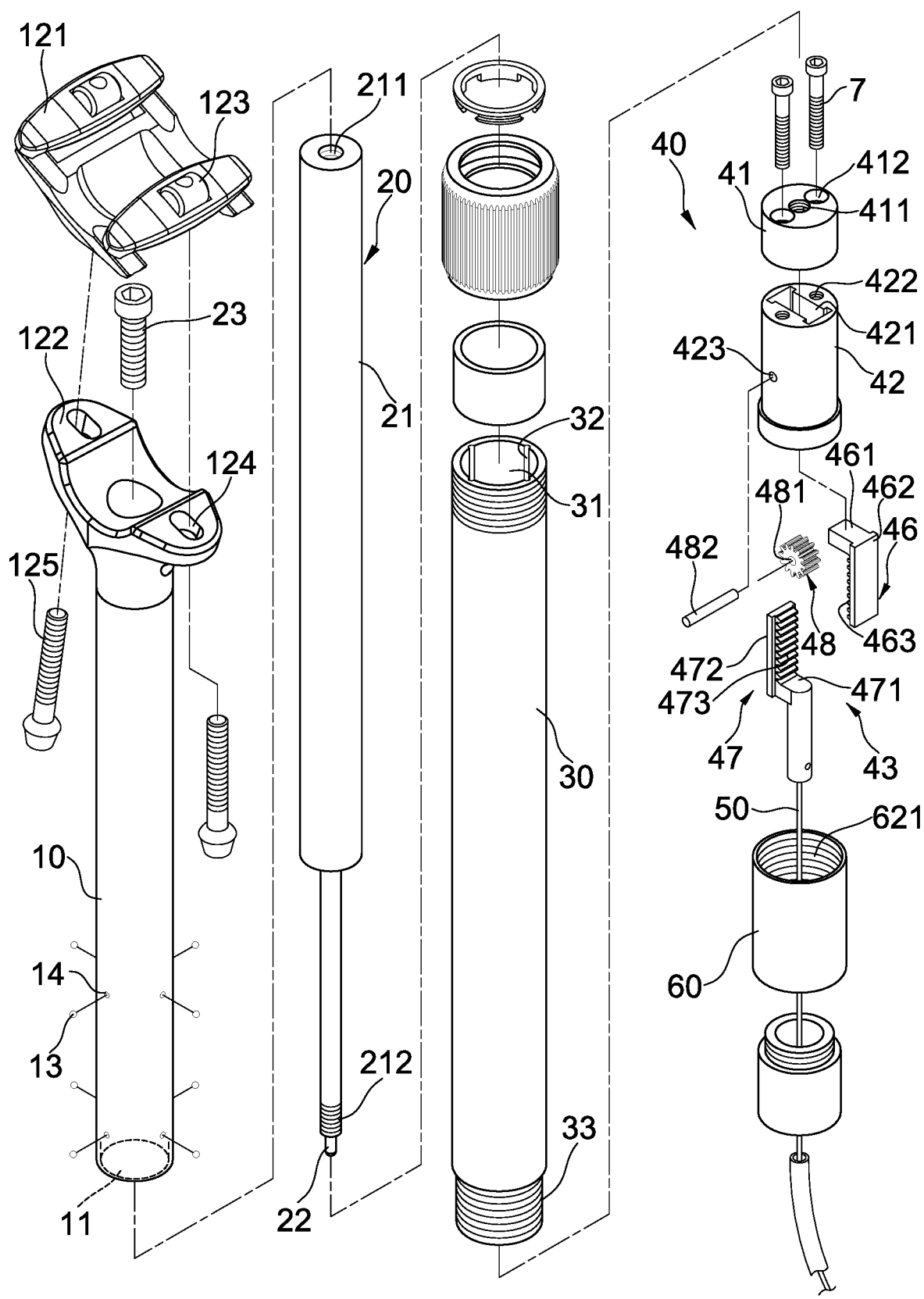
FIG. 2 is an exploded view of the height adjustment assembly of the present invention.
Figure 3:
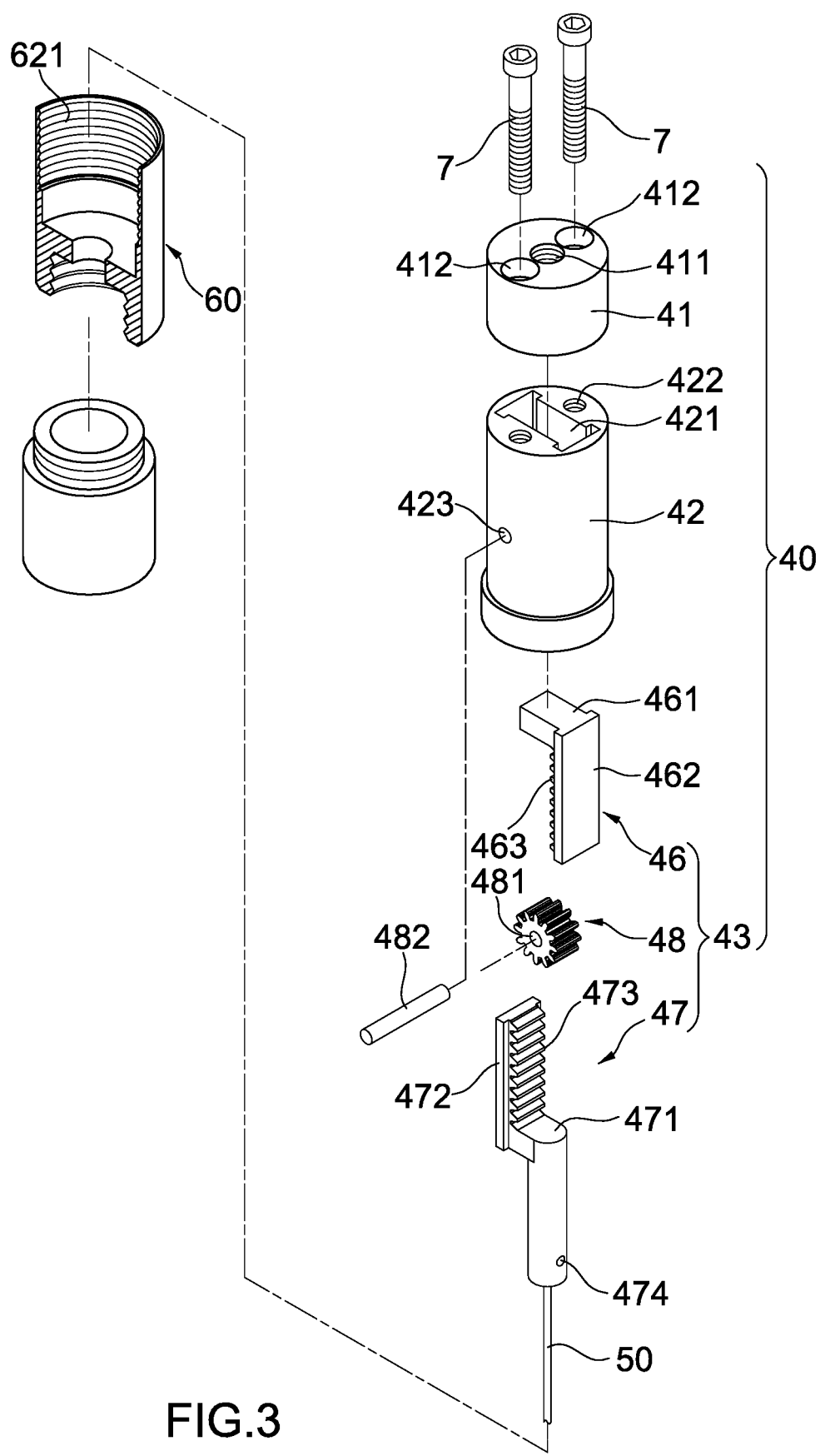
FIG. 3 is an exploded view of the control device of the height adjustment assembly of the present invention.
Figure 4:
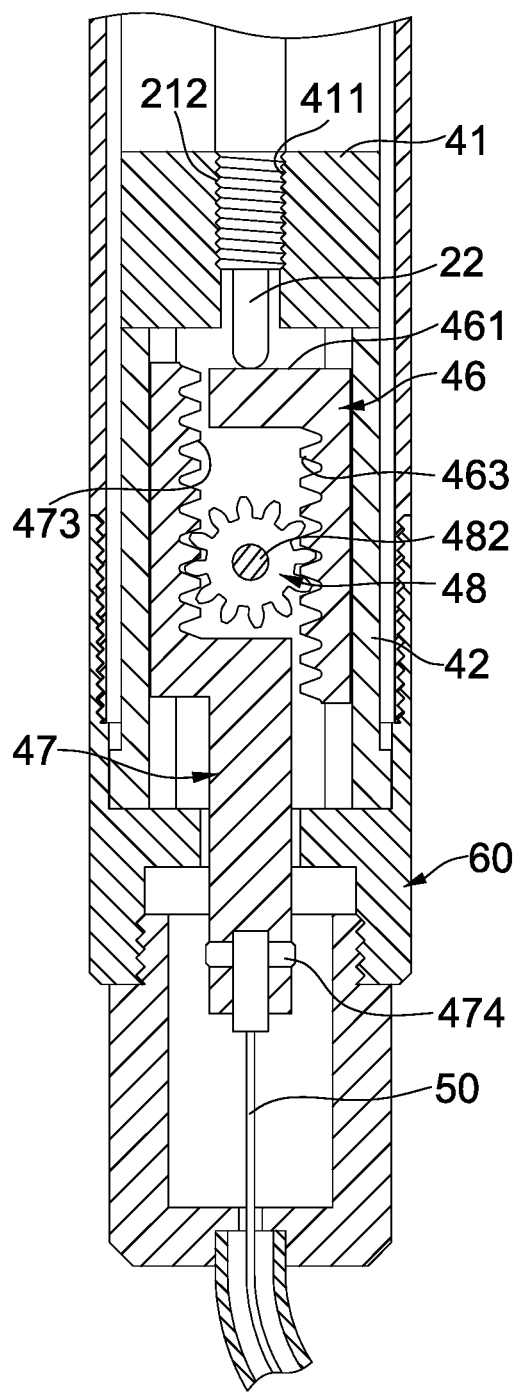
FIG. 4 is an cross sectional view, taken along line IV-IV of FIG. 1.
Figure 5:
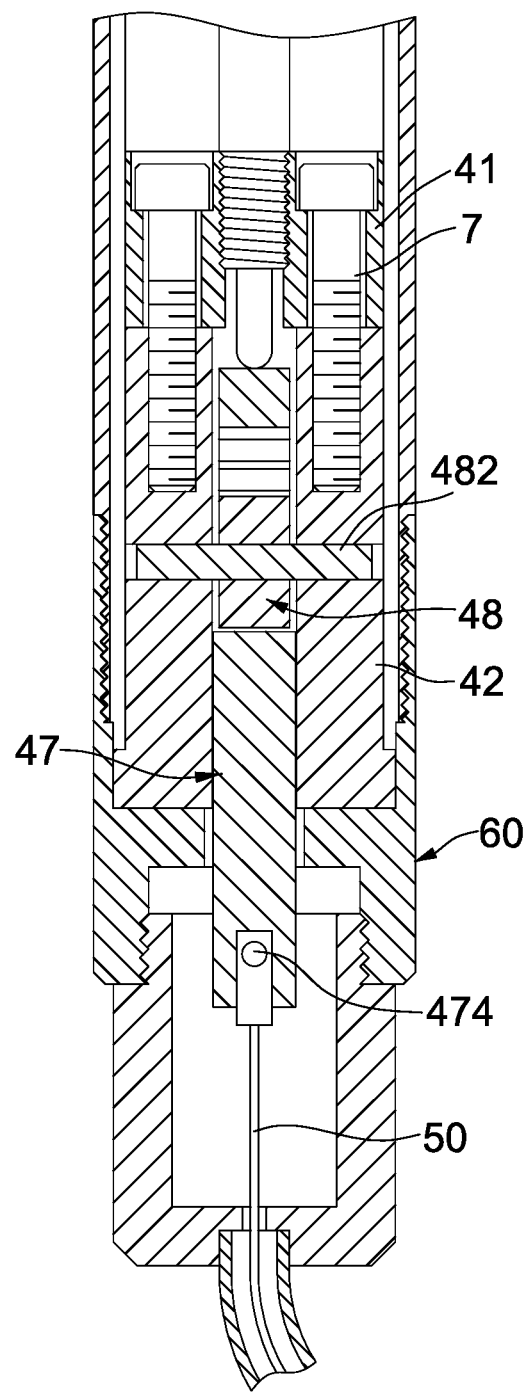
FIG. 5 is an cross sectional view, taken along line V-V of FIG. 1.
Figure 6:
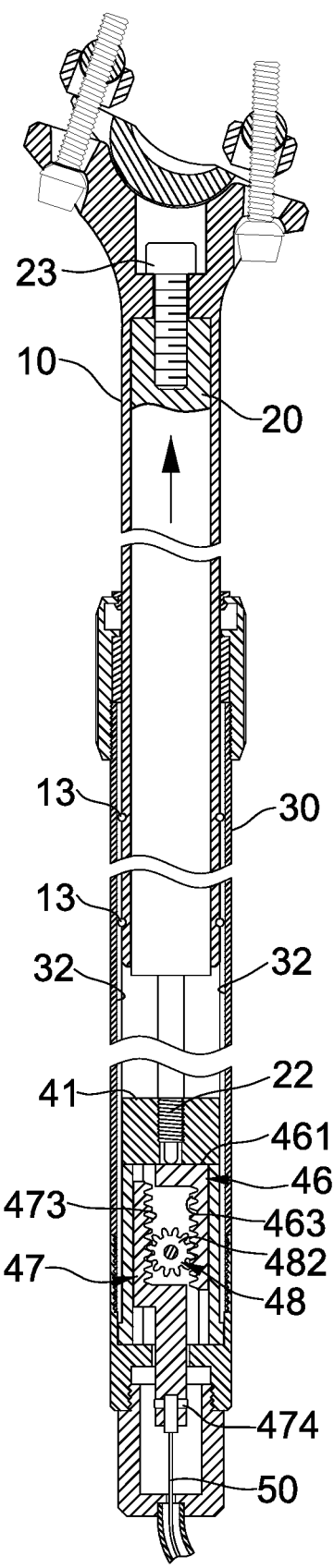
FIG. 6 shows that the inner tube and the saddle clamp are moved upward.
Figure 7:
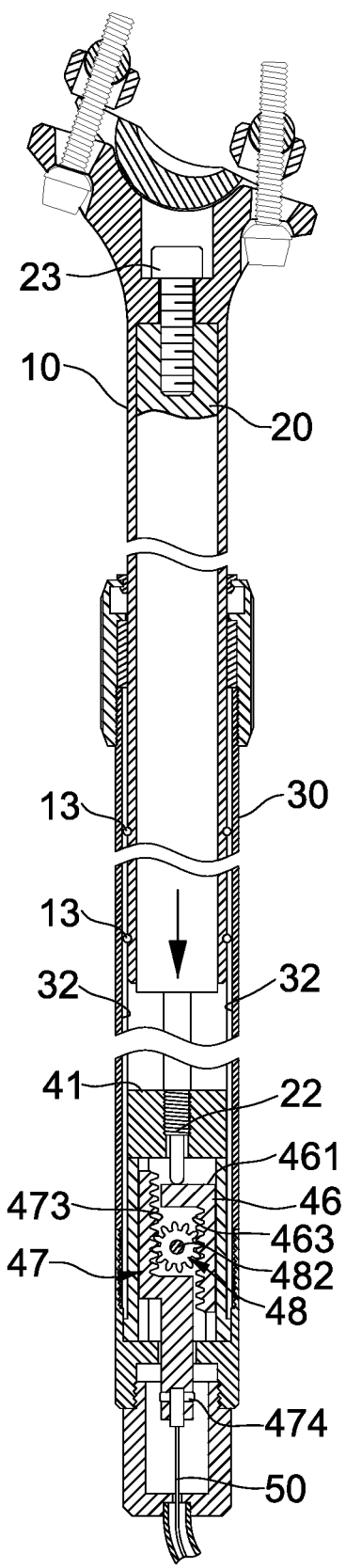
FIG. 7 shows that the inner tube and the saddle clamp are moved downward.
Figure 8:
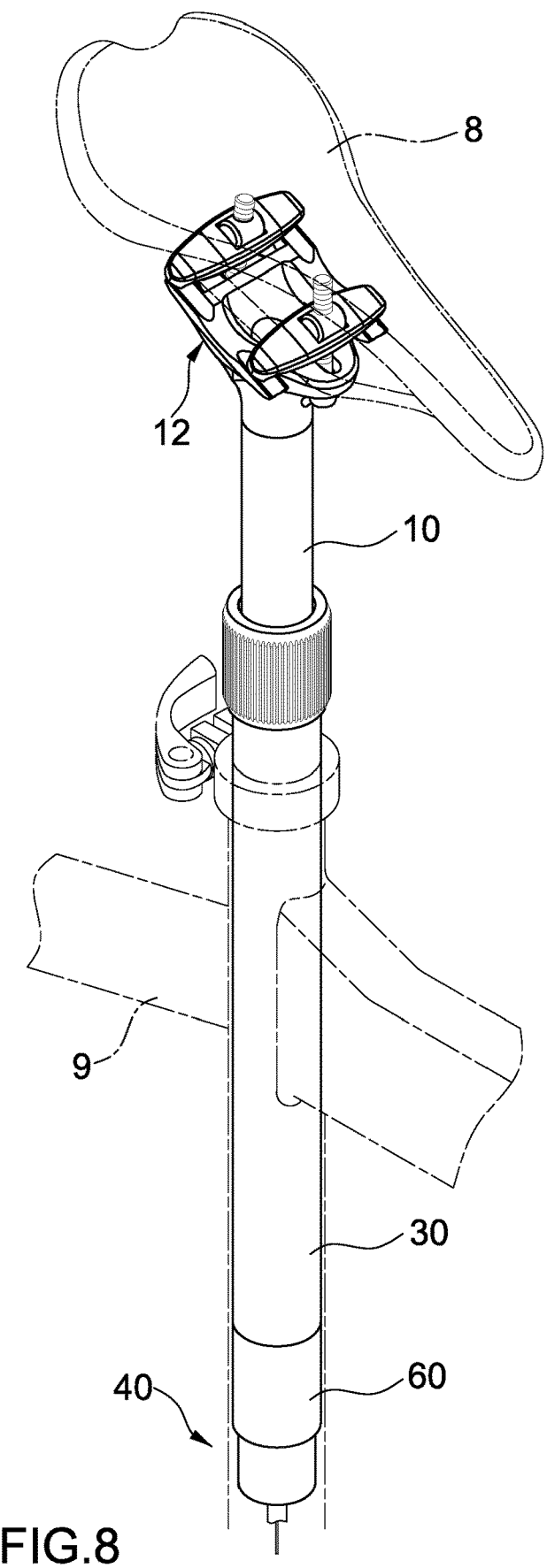
FIG. 8 shows the height adjustment assembly of the present invention is installed to a bicycle.

Referring to FIGS. 1 to 8, the height adjustment assembly for a bicycle saddle of the present invention is connected to the seat tube of a bicycle frame 9 as shown in FIG. 8, and comprises an inner tube 10 which includes a first passage 11 defined axially therethrough. A saddle clamp 12 is connected to the top of the inner tube 10 so as to clamp a saddle 8. The saddle clamp 12 includes a top piece 121 and a bottom piece 122. The top piece 121 has two universal connectors 123, and the bottom piece 122 includes two bores 124. Two bolts 125 extend through the two bores 124 and connected with the universal connectors 123 to clamp the saddle 8 as known in the art.

A retractable device 20, such as a hydraulic cylinder or a pneumatic cylinder, includes a body 21 and a switch 22, wherein the body 21 includes a top hole 211 defined in the top end thereof, and a first threaded section 212 is formed on the lower end thereof. A bolt 23 extends through the saddle clamp 12 and is threadedly connected to the top hole 211. An outer tube 30 has a second passage 31 defined axially therethrough, and a second threaded section 33 extends from the lower end of the outer tube 30. The inner tube 10 is movably inserted into the outer tube 30. Specifically, the inner tube 10 has multiple beads 13 on an outer periphery thereof. The outer tube 30 has multiple grooves 32 defined in the second passage 31. The beads 13 are respectively movable within the grooves 32 to prevent the inner tube 10 from spinning in the second passage 31 of the outer tube 30.

A control device 40 is located in the second passage 31 and includes a top part 41, a block 42 and an operation unit 43. The top part 41 has a locking hole 411 defined through the center thereof. The locking hole 41 is located between two through holes 412. The first threaded section 212 of the retractable device 20 is connected to the locking hole 411 to secure the retractable device 20 between the inner tube 10 and the outer tube 30. The block 42 has a room 421 defined through the center thereof, and the room 421 is located between two threaded holes 422. Two bolts 7 extend through the two through holes 412 of the top part 41 and are connected to the threaded holes 422 of the block 42 to connect the top part 41 with the block 42. The operation unit 43 is located in the room 421 and includes an ascending member 46, a descending member 47 and a gear 48. The ascending member 46, the descending member 47 and the gear 48 are located in the room 421. The ascending member 46 and the descending member 47 each have a horizontal portion 461/471 and a vertical portion 462/472 which is connected perpendicular to the horizontal portion 461/471. Each of the vertical portions 462, 472 has a toothed portion 463/473 which is engaged with the gear 48 located between the two respective vertical portions 462, 472. Specifically, the block 42 has a radial hole 423 defined radially therethrough. The gear 48 has a central hole 481. A pin 482 extends through the radial hole 423 and the central hole 481 to position the gear 48 in the room 421. The descending member 47 has an anchoring portion 474 which is connected with one end of the cable 50. The switch 22 of the retractable device 20 extends through the locking hole 411 and contacts the top of the operation unit 43. The operation unit 43 is activated by pulling the cable 50 so as to press the switch 22 of the retractable device 20. Therefore, the retractable device 20 is activated to move the body 21 with the saddle clamp 12. A sleeve 60 has inner threads 621 defined in the inner periphery thereof. The second threaded section 33 of the outer tube 30 is connected to the inner threads 621 of the sleeve 60 to retain all of the parts mentioned in the outer tube 30.

When the cable 50 is pulled, the descending member 47 is pulled downward by the cable 50, and the toothed portion 472 of the descending member 47 rolls the gear 48 to move the ascending member 46 upward. The horizontal portion 461 of the ascending member 46 pushes the switch 22 of the retractable device 20, so that the body 21 moves upward to move the inner tube 10 together with the saddle clamp 12 move upward.

While we have shown and described the embodiment in accordance with the present invention, it should be clear to those skilled in the art that further embodiments may be made without departing from the scope of the present invention.

What is claimed is:

1. A height adjustment assembly for a bicycle saddle, comprising:

an inner tube having a first passage defined axially therethrough, a saddle clamp connected to a top of the inner tube and adapted to clamp a saddle;

a retractable device including a body and a switch, the body including a top hole defined in a top end thereof, and a first threaded section on a lower end thereof, a bolt extending through the saddle clamp and threadedly connected to the top hole;

an outer tube having a second passage defined axially therethrough, a second threaded section extending from a lower end of the outer tube;

a control device located in the second passage and including a top part, a block and an operation unit, the top part having a locking hole defined through a center thereof, the locking hole located between two through holes, the first threaded section of the retractable device connected to the locking hole to secure the retractable device between the inner tube and the outer tube, the block having a room defined through a center thereof, the room located between two threaded holes, two bolts extending through the two through holes of the top part and connected to the threaded holes of the block to connect the top part with the block, the operation unit located in the room, the switch of the retractable device extending through the locking hole and contacting a top of the operation unit, the operation unit adapted to be activated by a cable and being configured to activate the retractable device, and a sleeve having inner threads defined in an inner periphery thereof, the second threaded section of the outer tube connected to the inner threads of the sleeve.

2. The height adjustment assembly as claimed in claim 1, wherein the operation unit includes an ascending member, a descending member and a gear, the ascending member, the descending member and the gear are located in the room, the ascending member and the descending member each have a horizontal portion and a vertical portion which is connected perpendicular to the horizontal portion, each of the vertical portions has a toothed portion which is engaged with the gear, the descending member has an anchoring portion which is adapted to be connected with one end of the cable.

3. The height adjustment assembly as claimed in claim 1, wherein the inner tube has multiple beads on an outer periphery thereof, the outer tube has multiple grooves defined in the second passage, the beads are respectively movable within the grooves to prevent the inner tube from spinning in the second passage of the outer tube.

4. The height adjustment assembly as claimed in claim 1, wherein the block has a radial hole defined radially therethrough, the gear has a central hole, a pin extends through the radial hole and the central hole to position the gear in the room.

5. The height adjustment assembly as claimed in claim 1, wherein the retractable device is a hydraulic cylinder or a pneumatic cylinder.

* * * * *